J. A. NOEL.
CAR BRAKE.
APPLICATION FILED MAR. 8, 1911.

1,015,063.

Patented Jan. 16, 1912.

2 SHEETS—SHEET 1.

Witnesses

Inventor
John A. Noel

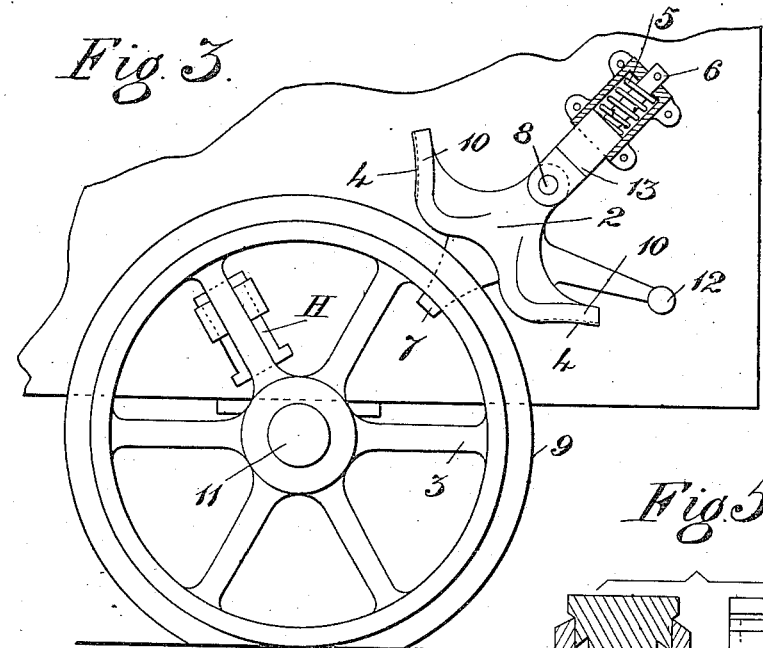
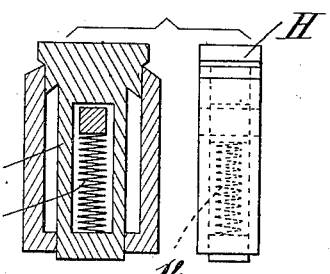
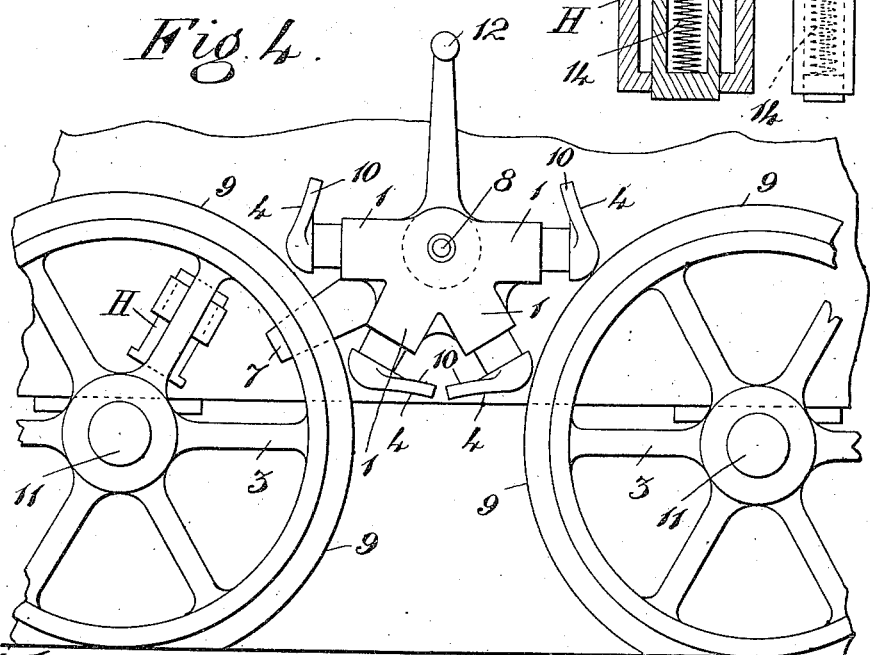

UNITED STATES PATENT OFFICE.

JOHN ABRAHAM NOEL, OF CARDIFF, ENGLAND.

CAR-BRAKE.

1,015,063.   Specification of Letters Patent.   Patented Jan. 16, 1912.

Application filed March 8, 1911. Serial No. 613,152.

*To all whom it may concern:*

Be it known that I, JOHN ABRAHAM NOEL, a subject of the King of Great Britain, residing at 1 Romilly road, Cardiff, Wales, Great Britain, have invented certain new and useful Improvements in Car-Brakes, of which the following is a specification.

My present invention relates to an improvement in apparatus for braking or spragging mining trams, street trams and other road vehicles.

The invention will be clearly understood from the following description aided by the annexed drawings in which:—

Figure 1:
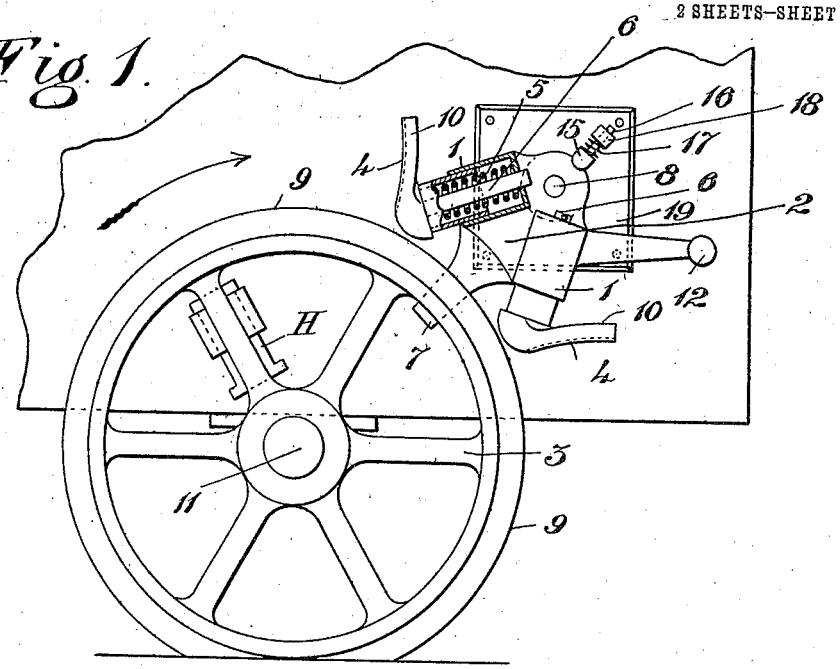
Figure 2:
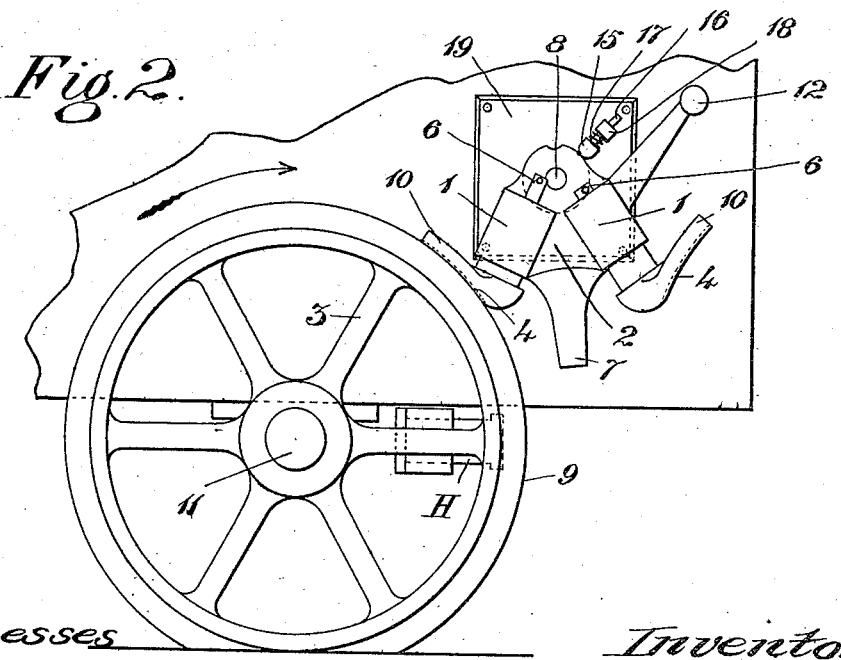

Figure 1 is a side elevation of a wheel, and portion of a truck with the improved apparatus shown partly in section and unbraked. Fig. 2 is a view similar to Fig. 1 but showing the apparatus in elevation and braked. Fig. 3 is a similar view to Fig. 1 but showing two brake blocks controlled by one spring. Fig. 4 is an elevation of a portion of a truck showing two wheels with the apparatus constructed for braking both wheels at one time. Fig. 5 is a sectional elevation and side view of a modified form of sliding catch.

For the purpose of the invention I employ the sliding catch block H on one of the spokes of the wheel, and to some other fixed part of the vehicle I pivot a device consisting of two chambers 1, 1, attached to a plate 2 and positioned at an angle to each other and tangentially to the circumference of the wheel 3 and in proximity to the edge of said wheel. These chambers carry brake blocks 4 which project therefrom and are controlled by springs 5, 5, preferably helical and positioned within the chambers 1 and encircling the stems 6 that project from the brake blocks and pass through said chambers 1 for action under or against the brake block 4. One part of plate 2 of the pivoted device is provided with an angular projection 7 against which the sliding catch H will abut when moved outward by centrifugal action so as to move said plate on its pivot pin 8 so that one of the brake blocks 4 is forced onto the wheel rim 9, compressing the spring 5 and thus braking the wheel 3. The chambers 1 are positioned so that the sliding catch H causes only one to come into action, and this one in accordance with the direction of rotation of the wheel.

The faces of the brake blocks may be curved as shown to suit the rim of the wheel, and have curved extensions 10 from one side of their stems 6, and when the device is moved by the said sliding catch H, to bring a brake block 4 on to the wheel, the action is first to bring the chamber 1 and the brake block stem 6 into line with the pivot 8 of the device and the axle 11 of the wheel, compressing the spring 5 and braking the wheel, and then to carry the chamber and stem over said center line when the spring 5 is slightly released. In this position, shown in Fig. 2 of the drawing, the wheel is held firmly by reason of the brake surface engaging the wheel rim behind the stem of the brake. To release the brake the vehicle is reversed in its movement, but I may provide the device with a handle 12 by which the brake can be removed or applied, so that the brake may be used with or without the wheel catch.

The brake blocks may be connected to a single stem, as shown in Fig. 3 in which case the said stem is encircled by a square or other collar 13 which abuts against a flat end of the brake block connecting piece and also against the spring 5 so that as either brake block is moved its end in canting forces the collar up against the spring and compresses same, the action being the same as before.

In Figs. 1, 2 and 3, I have shown two brakes connected together for operating on the wheel in either direction but in Fig. 4, I show a form of brake for operating between and on two wheels in either direction, and in order to act upon the wheels on both sides of the vehicle by one handle as a brake, or by one wheel catch as an emergency brake, I may use a shaft connecting the both sides of the vehicle.

In Fig. 5, I have shown the sliding catch H fitted within a casing and controlled by a spring 14. This is useful in case more than one wheel be fitted with the emergency catch as it has been found that the first sliding catch coming into operation causes the speed to be retarded and the others drop back in their place, thus not properly braking the four wheels; but by this construction all the catches have action when the speed of the wheels is such as to cause them to move out thus insuring proper braking of each wheel. Each catch may be provided with the V head when used with a fixed stop on the wheel.

15 is a stop on a rod 16 and controlled by a spring 17, the rod riding in a lug 18 on the plate 19 carrying the braking appliances and fitted to the side of the vehicle (or this spring detent may be situated on the rocking lever) the stop 15 entering a recess on the plate 2 so as to hold the device in the unbraked position. The said stop may be forced away from the plate on the movement of the catch H.

Some wheels are extremely loose and move sidewise to some extent, and for such I allow the brake lever to move along the pivot or rocking pin and provide horns on the brake lever which embrace the wheel flange or wheel rim and come into contact with the wheel when any side movement takes place.

The device is adaptable to horse drawn vehicles as well as rail traction work, and it may be used as a simple brake irrespective of the emergency wheel catch.

What I do claim as my invention and desire to secure by Letters Patent is:—

1. In a braking apparatus for wheeled vehicles, the combination, with a catch carried by a wheel, of a rocking chamber having a projection associated therewith, and a brake block having a spring-controlled stem slidably working in said chamber, said catch being adapted to strike against said projection during the rotation of said wheel, for rocking said chamber, to move said block into engagement with the rim of said wheel.

2. In a braking apparatus for wheeled vehicles, the combination, with a catch slidably mounted on one of the spokes of a wheel and adapted to move outwardly upon the spoke under the centrifugal force exerted thereon when the speed of rotation of the wheel reaches a predetermined point, of a rocking chamber having a projection associated therewith, and a brake block having a spring-controlled stem slidably working in said chamber, said catch being adapted to strike against said projection during its outward movement for rocking said chamber, to move said block into engagement with the rim of said wheel.

3. In a braking apparatus for wheeled vehicles, the combination of a pair of connected pivotally-mounted chambers disposed at an angle to each other and tangentially to the rim of a wheel, a brake block having a spring-controlled stem working in each chamber, and means for swinging said chambers in unison to move one of said blocks into engagement with said wheel rim.

In testimony whereof I have hereunto set my hand in presence of two subscribing witnesses.

JOHN ABRAHAM NOEL.

Witnesses:
G. A. KYNCH,
SAMUEL N. RICHARD.

Copies of this patent may be obtained for five cents each, by addressing the "Commissioner of Patents, Washington, D. C."